United States Patent
Focke et al.

(10) Patent No.: US 7,501,980 B2
(45) Date of Patent: Mar. 10, 2009

(54) METHOD AND DEVICE FOR CALIBRATING SENSORS IN A MOTOR VEHICLE

(75) Inventors: Thomas Focke, Ahrbergen (DE); Wolfgang Niehsen, Bad Salzdetfurth (DE); Jeries Mustaklem, Berlin (DE); Frank Suhling, Hannover (DE); Mario Mueller, Hannover (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 10/519,727

(22) PCT Filed: Apr. 4, 2003

(86) PCT No.: PCT/DE03/01111

§ 371 (c)(1), (2), (4) Date: Jul. 20, 2005

(87) PCT Pub. No.: WO2004/003586

PCT Pub. Date: Jan. 8, 2004

(65) Prior Publication Data

US 2006/0164295 A1   Jul. 27, 2006

(30) Foreign Application Priority Data

Jun. 29, 2002 (DE) ............................. 102 29 334

(51) Int. Cl.
  *G01S 13/40* (2006.01)
(52) U.S. Cl. ............................. 342/174; 342/70
(58) Field of Classification Search ............. 342/174
  See application file for complete search history.

(56) References Cited

U.S. PATENT DOCUMENTS

| | | | |
|---|---|---|---|
| 2,961,654 A * | 11/1960 | Simon | 342/165 |
| 3,806,943 A | 4/1974 | Holloway | |
| 6,020,844 A * | 2/2000 | Bai et al. | 342/165 |
| 6,061,015 A * | 5/2000 | Sugimoto | 342/71 |
| 6,335,705 B1 * | 1/2002 | Grace et al. | 343/703 |
| 6,363,619 B1 * | 4/2002 | Schirmer et al. | 33/288 |
| 6,437,731 B1 * | 8/2002 | Henrio et al. | 342/165 |
| 6,636,172 B1 * | 10/2003 | Prestl et al. | 342/173 |
| 6,771,208 B2 * | 8/2004 | Lutter et al. | 342/52 |
| 6,933,883 B2 * | 8/2005 | Isaji | 342/174 |

(Continued)

FOREIGN PATENT DOCUMENTS

DE   197 07 590   12/2000

(Continued)

OTHER PUBLICATIONS

English Language Translation of EP 0 275 430.

(Continued)

*Primary Examiner*—Thomas H Tarcza
*Assistant Examiner*—Matthew M Barker
(74) *Attorney, Agent, or Firm*—Kenyon & Kenyon LLP

(57) ABSTRACT

A method and a device are described for calibrating at least two sensors, the sensors being of a different sensor type. The sensors may be located in or on a motor vehicle. It is possible to calibrate the at least two sensors in one operation by using a calibration object containing reference features for determining calibration data for the at least two sensors.

12 Claims, 3 Drawing Sheets

U.S. PATENT DOCUMENTS

| | | | |
|---|---|---|---|
| 6,975,265 B2 * | 12/2005 | Schlick et al. | 342/165 |
| 2001/0012985 A1 * | 8/2001 | Okamoto et al. | 702/94 |
| 2002/0072869 A1 * | 6/2002 | Stiller | 702/90 |
| 2002/0167726 A1 * | 11/2002 | Barman et al. | 359/458 |

FOREIGN PATENT DOCUMENTS

| | | |
|---|---|---|
| DE | 197 07 590 C2 | 12/2000 |
| DE | 19962997 | 6/2001 |
| DE | 100 49 684 | 4/2002 |
| EP | 0 275 430 | 7/1988 |
| EP | 1 134 549 | 9/2001 |
| WO | WO 98 38691 | 9/1998 |

OTHER PUBLICATIONS

English Language Translation of EP 1 134 549.
English Language Translation of DE 100 49 684.
English Language Translation of DE 197 07 590.

* cited by examiner

METHOD AND DEVICE FOR CALIBRATING SENSORS IN A MOTOR VEHICLE

FIELD OF THE INVENTION

The present invention relates to vehicle sensors, and in particular relates to a method and device for calibrating sensor in a motor vehicle.

BACKGROUND INFORMATION

The use of a plurality of sensors in motor vehicles for detecting the vehicle environment is known. For example, radar sensors are used to detect the vehicle environment in the direction of travel. This makes it possible to regulate the speed of the vehicle, the road speed being adapted to slower moving vehicles when the radar sensor detects them in the heading range of the motor vehicle.

For the sensors to function properly, they must be aligned with respect to the motor vehicle and the vehicle environment. To this end, the sensors are calibrated in an environment similar to a laboratory after they have been installed in the vehicle. For example, a method for aligning the beam pattern of a radar sensor is described in German Patent Application No. 197 07 590. A calibration object having the reference features for determining the calibration data is used for calibration. References to the calibration of additional sensors are not mentioned.

SUMMARY OF THE INVENTION

The method of the present invention has the advantage that through the use of a common calibration object for various sensor types, the sensors are aligned on a coordinate system. This makes it possible for the data of the sensors calibrated in this manner to be used jointly without discrepancies in the measurements.

This is advantageous in particular in the use of a radar sensor and an image sensor system. For example, it is possible to combine the data detected by a radar sensor concerning a vehicle traveling in front of the vehicle with the data from the image sensor system concerning the same vehicle as an image object. It is possible to use this for a redundant, corrective analysis of the data of both sensors.

The method and the device according to the present invention reduce the time and effort required for calibrating sensors that are situated in a motor vehicle, for example. It is possible to perform the calibration in one operation during production or when a motor vehicle visits a workshop after the installation of a radar sensor and an image sensor system. The use of a single calibration object may advantageously make it possible to determine the calibration data of both sensors simultaneously, i.e., the calibration data is determined in one operation in a close temporal relationship. This results in a reduction of the time required to calibrate sensors during the production or repair of a motor vehicle. This is associated with a reduction in the production or repair costs.

The calibration data may be used further by downstream systems. The calibration data may be stored and/or analyzed and/or displayed and/or transmitted and/or further processed. Furthermore, the sensors themselves can use the calibration data further in an advantageous manner. For example, it is possible in a radar sensor to use the calibration data to correct the discrepancy of the sensor axis in relation to the direction of the vehicle longitudinal axis. In an image sensor system, it is possible to use the calibration data to correct the image data automatically. The extrinsic parameters, such as the geometrical installation position and the direction of the sensor axis, and/or intrinsic parameters, such as the camera's principal point, the camera constant and the distortion, are determined here as calibration data.

In an advantageous manner in particular, it is possible to use at least one additional sensor as a reference for calibrating a sensor. The calibration data of the sensor is formed from the data of the detected calibration object and additionally from the measured data of at least one additional sensor, this reference sensor using the same calibration object. In a motor vehicle having a radar sensor and an image sensor system, it is possible, for example, to use the data of the image sensor system as a reference for determining the calibration data of the radar sensor. In an advantageous manner in particular, it is possible, for example, during a repair of the radar sensor, with a recalibration being necessary, to form the calibration data of the radar sensor from the measured data of the image sensor system and the data of the calibration object detected by the radar sensor. This advantageously results in an increase in the measuring accuracy of the radar sensor.

It may be particularly advantageous to use a single calibration object which has at least one reference feature for each sensor for the at least two sensors, the at least two sensors being of a different sensor type. The combination of the reference features into one calibration object for calibrating at least two sensors of a different sensor type substantially facilitates the calibration, for example, in the production of a motor vehicle because it is now only necessary to align the motor vehicle to one calibration object.

In addition, the combination of the reference features into one calibration object has the advantage that the calibration object may be designed in such a way that the physical position of the reference features in relation to each other is known. In an advantageous manner, this forms the basis for using the measured data of a sensor as a reference for another sensor.

A triple mirror may be used as a reference feature for the radar sensor. Triple mirrors are distinguished by three reflection surfaces, which are perpendicular in relation to each other, which make a parallel reflection of the incident radar beam possible, the radar beam being reflected in a wide angular range parallel to the incident beam with reference to the reflection surfaces.

In one variation of the calibration object, calibration marks are placed on the triple mirror. This advantageously makes it possible to use the triple mirror as a reference feature for the radar sensor and the image sensor system. The use of this device makes any additional reference features for the image sensor system unnecessary. Furthermore, this system makes the physical position of the reference features known for the radar sensor and the image sensor system. It is thus possible to use the radar sensor as a reference for the image sensor system and the image sensor system as a reference for the radar sensor.

DETAILED DESCRIPTION

Figure 1:
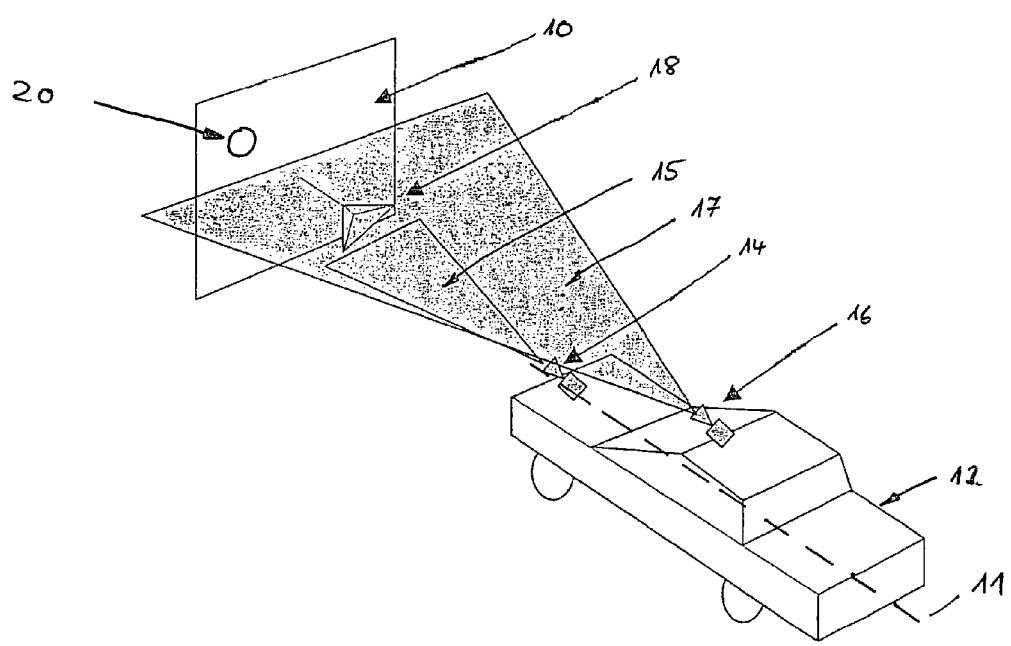
FIG. 1 shows an embodiment of a device for calibrating sensors in the motor vehicle according to the present invention.

FIG. 1 shows an exemplary embodiment for calibrating sensors 14, 16. Motor vehicle 12 includes a radar sensor 14, which may be attached to the bumper, and an image sensor system 16, which may be situated in the vehicle interior. Both sensors 14, 16 have a detection range 15, 17, each of which is aligned in the direction of vehicle longitudinal axis 11 in the direction of travel of motor vehicle 12. In an exemplary embodiment, the direction of detection ranges 15, 17 is determined by the sensor axes. In radar sensor 14, the direction of maximum sensitivity of radar sensor 14 determines the sensor axis while in image sensor system 16, the optical axis is the sensor axis. In the exemplary embodiment, detection range 15 of radar sensor 14 coincides with detection range 17 of image sensor system 16. Image sensor system 16 may include one image sensor whose design is based, for example, on CMOS or CCD technology. Motor vehicle 12 is aligned in front of a calibration object 10 in such a way that radar sensor 14 and image sensor system 16 detect reference features 18, 20 on calibration object 10. It may be sufficient that radar sensor 14 detects reference feature 18 and image sensor system 16 detects reference feature 20. Calibration object 10 is a flat or three-dimensional system of reference features 18, 20, which are connected by a mechanical mounting device. Both reference features 18, 20 may be mounted on a flat wall, which is used as a mounting device. Reference features 18, 20 are designed in such a way that they are always detectable by radar sensor 14 and image sensor system 16. Reference feature 18, which is detected by radar sensor 14, has characteristic properties. Radar sensor 14 may be a radar receiver which is combined with a transmitter for radar radiation. Reference feature 18 is designed in such a way that it reflects the incident radar beam back to radar sensor 14, and may be implemented as a triple mirror. Reference feature 20, which is detected by image sensor system 16, also has particular properties. Reference feature 20 may have a high contrast and/or a reflective surface and/or a particular shape, such as a circular or rectangular shape, for example. In order to calibrate image sensor system 16, one to any desired number of reference features 20 is employed, such as between ten and 50 reference features 20. For example, 40 reference features 20 may be used to determine the calibration data of image sensor system 16, their physical location being known. This makes a redundant determination of the calibration data for image sensor system 16 possible.

Figure 2:
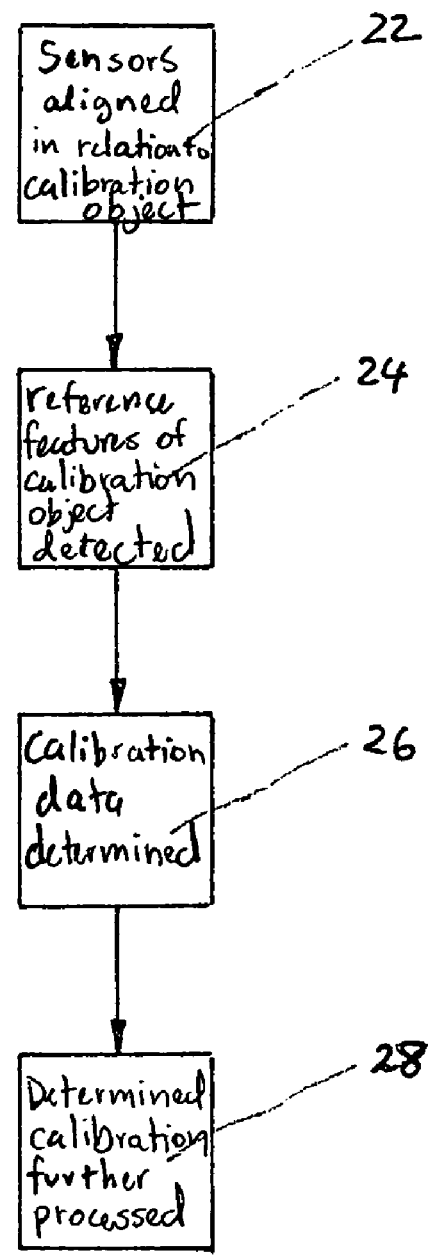
FIG. 2 shows a flowchart of an embodiment of the method for calibrating sensors according to the present invention.

FIG. 2 shows an exemplary flowchart of the method for calibrating sensors 14, 16 according to the present invention. In block 22, sensors 14, 16 are aligned in relation to calibration object 10. This may be done by aligning motor vehicle 12, on which radar sensor 14 and image sensor system 16 is located, in relation to calibration object 10. Alternatively, it is possible to align calibration object 10 in relation to motor vehicle 12. In block 24, reference features 18, 20 of calibration object 10 are detected by sensors 14, 16. Block 26 is used to determine the calibration data for radar sensor 14 and image sensor system 16 from the data determined of detected calibration object 10. The calibration data are determined simultaneously, i.e., the calibration data are determined in one operation in a close temporal relationship. The direction of the sensor axis in relation to vehicle longitudinal axis 11 and/or the intensity of the radar beam may be determined as calibration data in radar sensor 14.

To determine the calibration data, known reference feature 20 is recorded as an image in block 24 in image sensor system 16 and the individual parameters of the calibration data are calculated in a computation of adjustment in subsequent block 26. In an exemplary embodiment, extrinsic parameters, such as the geometric installation position, the direction of the sensor axis, and/or intrinsic parameters, such as the camera's principal point, the camera constant and the distortion, are determined as calibration data in a single image sensor system 16. The determined calibration data is further processed in block 28. The calibration data may be stored, analyzed, displayed, transmitted and/or further processed by at least one downstream system 34. In addition, the calibration data is further used directly for calibration in participating sensors 14, 16. In doing so, it is possible to process and store the calibration data. The image sensor system 16 may use the calibration data for the automatic correction of the images in the operation of image sensor system 16. In the exemplary embodiment, radar sensor 14 uses the calibration data for the automatic correction of the deviation of the sensor axis in relation to the direction of vehicle longitudinal axis 11. As an alternative, it is possible to display the determined calibration data and thus, for example, to make it possible for an automotive mechanic to use the calibration data for the mechanical adjustment of radar sensor 14. This procedure is possible during the manufacture or the repair of a motor vehicle 12.

Figure 3:
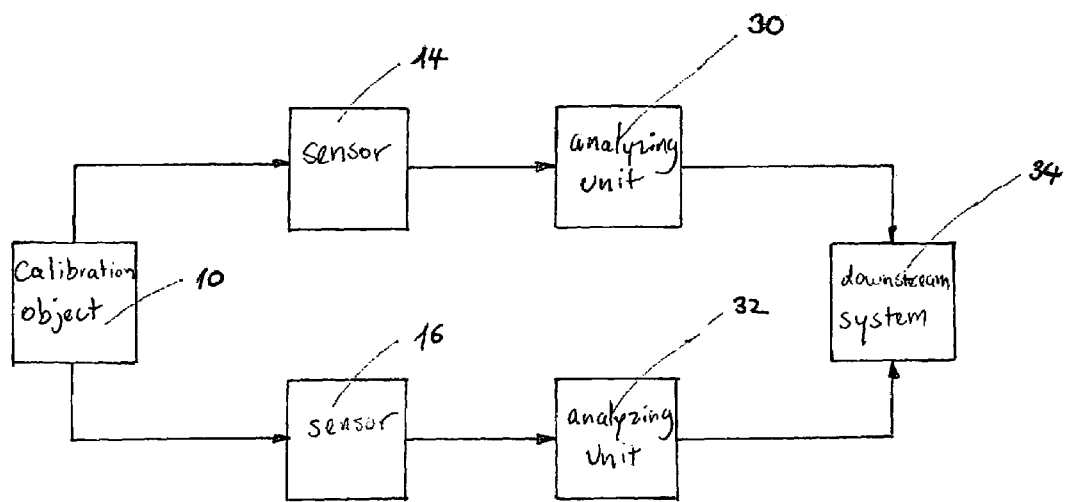
FIG. 3 shows a block diagram of the device for calibrating sensors according to the present invention.

FIG. 3 shows a block diagram of an exemplary embodiment of the device for calibrating sensors 14, 16 according to the present invention. In the exemplary embodiment, a radar sensor 14 and an image sensor system 16 detect a calibration object 10. The calibration data for the two sensors 14, 16 is determined in two analyzing units 30, 32. The calibration data is further utilized in a downstream system 34.

The method described above and the device for calibrating sensors 14, 16 are not limited to radar sensors 14 and image sensor systems 16 in motor vehicles 12. Instead, sensors 14, 16 may be calibrated in systems outside of motor vehicle 12, sensors 14, 16 being characterized by a three-dimensional detection range 15, 17 and having one sensor axis. In particular, the described method and the device may be used in radar sensors 14, image sensor systems 16, light sensors, ultrasound sensors and/or LIDAR sensors. At the same time the method may also be implemented with more than two sensors 14, 16. With more than two sensors 14, 16, sensors 14, 16 of the same sensor type using the same reference features 18, 20 may also be used. Two possible systems are, for example, at least one radar sensor 14 including at least two image sensor systems 16 or at least two radar sensors 14 including at least one image sensor system 16, sensors 14, 16 being situated in a motor vehicle 12. If at least two image sensor systems 16 are used, additional calibration data is determined, which contain the physical position and/or the alignment of the sensor axes of image sensor systems 16 in relation to each other.

The alignment of detection ranges 15, 17 of sensors 14, 16 is discretionary. Detection ranges 15, 17 may include the vehicle environment. It is also possible to align detection ranges 15, 17 into the vehicle interior. Any desired mutual alignment of detection ranges 15, 17 of sensors 14, 16 is possible. In particular, the identical or diametrically opposed alignment of detection ranges 15, 17 is possible. Sensors 14, 16 may be situated both within motor vehicle 12 as well as outside of it. For example, it is possible to mount sensors 14, 16 in the interior of the vehicle and/or on the bumper and/or in the luggage compartment and/or in the engine compartment.

It is useful in this context for calibration object 10 be adjusted to the installation position and the alignment of detection ranges 15, 17 of sensors 14, 16 by the physical positioning of reference features 18, 20.

A coincidence of detection ranges 15, 17 of sensors 14, 16 is not a necessary prerequisite for implementing the method. In the case of detection ranges 15, 17 of sensors 14, 16 that do not coincide, calibration object 10 must simply be designed in such a way that a detection of necessary reference features 18, 20 is possible in one operation for each individual sensor 14, 16. It is not necessary for each sensor 14, 16 to detect entire calibration object 10 including all reference features 18, 20.

The method is also possible with moving sensors 14, 16 and/or with moving calibration object 10. For example, in the exemplary embodiment, the device is also usable in a moving motor vehicle 12.

In one variation of the described method, a sensor 14, 16 is used as a reference for another sensor 14, 16. For example, the calibration data of radar sensor 14 may be formed as a reference from the measured data of already calibrated image sensor system 16 and the data of calibration object 10 detected by radar sensor 14. The physical position of reference feature 18, which is used to determine the calibration data of radar sensor 14, may be determined by image sensor system 16. The physical position of reference feature 18 is determined indirectly by analyzing reference feature 20 using the known physical positioning of reference features 18, 20 in relation to each other.

In another variation of the described method, radar sensor 14 is used as a reference for image sensor system 16. Calibrated radar sensor 14 is used for the range finding. Radar sensor 14 determines the distance of reference feature 18 from radar sensor 14. Image sensor system 16 uses the known physical positioning of reference features 18, 20 and the determined distance of reference feature 18 from radar sensor 14 as a reference for determining the calibration data by analyzing calibration object 10.

The calibration data of sensors 14, 16 may be determined by separate analyzing units 30, 32. As an alternative, it is possible for a single analyzing unit to determine the calibration data. In another variation, the integration of analyzing units 30, 32 with sensors 14, 16 is possible.

In one variation of the described method, calibration object 10 may be connected directly to motor vehicle 12 by a mechanical link. This establishes the physical position of calibration object 10 in relation to motor vehicle 12.

In another variation of the described method, the use of a triple mirror having calibration marks makes it possible to determine the calibration data of radar sensor 14 and of image sensor system 16 directly on the triple mirror because the triple mirror having calibration marks has both a reference feature 18 for radar sensor 14 and a reference feature 20 for image sensor system 16. This makes it possible to use radar sensor 14 as a reference for image sensor system 16 and image sensor system 16 for radar sensor 14 for determining the calibration data. Moreover, additional reference features 20 may be present for image sensor system 16.

The number of reference features 18, 20 for individual sensors 14, 16 establishes the number of determinable parameters of the calibration data. With more reference features 18, 20 for individual sensors 14, 16, more parameters are determinable, and/or an overdetermination and an increase in the precision for determining the parameters is also possible.

The calibration by a single calibration object 10 in which the physical position of reference features 18, 20 is known, makes common use of sensors 14, 16 possible because the calibration data refers to a common coordinate system. In particular, when a radar sensor 14 and an image sensor system 16 are used in a motor vehicle 12, the measured data of radar sensor 14 may be combined with the data of image sensor system 16. In particular, vehicles traveling in front may be detected by both sensors 14, 16 and the measured data may be used for redundant error-reducing analyses.

What is claimed is:

1. A method for calibrating sensors in a motor vehicle, comprising:

calibrating at least two sensors, the at least two sensors each being of a different sensor type; and from the detection by a first one of the at least two sensors, determining data regarding the detection by a second one of the at least two sensors;

wherein the calibration includes using each of the at least two sensors to detect at least one part of a common calibration object, and wherein different ones of the at least two sensors detect different parts of the calibration object.

2. The method of claim 1, wherein calibration data are determined in a single operation.

3. The method of claim 2, wherein calibration includes:

aligning the at least two sensors such that the calibration object is in a detection range of each of the at least two sensors; and determining the calibration data for the at least two sensors from data regarding the detected calibration object.

4. The method of claim 3, wherein the calibration data is stored and further processed.

5. The method of claim 3, wherein data regarding the calibration object measured by at least one additional sensor is used as a reference data for determining the calibration data of one of the at least two sensors and wherein the calibration data of the one of the at least two sensors is formed by the reference data and data regarding the calibration object measured by the one of the at least two sensors.

6. The method of claim 3, wherein the at least two sensors include at least one image sensor system and at least one radar sensor.

7. A system for calibrating sensors in a motor vehicle, comprising:

at least two sensors;

at least one analyzing unit; and a calibration object;

wherein the at least one analyzing unit is configured for detecting at least a part of the calibration object by each of the at least two sensors, and from the detection by a first one of the at least two sensors, determining data regarding the detection by a second one of the at least two sensors, wherein the analyzing unit calibrates the at least two sensors using data of the detection of the at least a part of the calibration object, and wherein different ones of the at least two sensors detect different parts of the calibration object.

8. A calibration system for calibrating sensors in a motor vehicle, comprising:

at least two sensors;

an analyzing unit; and wherein the analyzing unit is configured for detecting at least a part of a first reference feature by each of the at least two sensors, and from a detection by a first one of the at least two sensors, determining data regarding the detection by a second one of the at least two sensors, wherein the analyzing unit calibrates the at least two sensors using data of the detection of the at least a part of the first reference feature, wherein different ones of the at least two sensors detect different parts of the first reference feature, and wherein the first reference feature is adapted to be detected by the at least two sensors for calibration of the at least two sensors, the at least two sensors each being of a different sensor type.

9. The calibration system of claim 8, wherein the spatial position of the first reference feature is at least one of: a) preset, and b) usable for determining calibration data of the at least two sensors in one operation.

10. The calibration system of claim 8, wherein a second reference feature is adapted to be detected by the at least two sensors for the calibration of the at least two sensors, and wherein the at least two sensors include at least one image sensor and at least one radar sensor, and the first and second reference features are included in a single calibration object.

11. The calibration system of claim 8, wherein the first reference feature includes at least one triple mirror.

12. The calibration system of claim 11, wherein the triple mirror includes calibration marks.

* * * * *